US011263302B2

(12) United States Patent
Finkenzeller et al.

(10) Patent No.: US 11,263,302 B2
(45) Date of Patent: Mar. 1, 2022

(54) TRANSACTION SYSTEM (71) Applicant: GIESECKE+DEVRIENT MOBILE SECURITY GMBH, Munich (DE)

(72) Inventors: Klaus Finkenzeller, Unterföhring (DE); Stephan Rasch, Unterföhring (DE); Dirk Riesenbeck, Vaterstetten (DE); Hans-Jürgen Roth, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 277 days.

(21) Appl. No.: 15/754,897

(22) PCT Filed: Aug. 22, 2016

(86) PCT No.: PCT/EP2016/001418
§ 371 (c)(1),
(2) Date: Feb. 23, 2018

(87) PCT Pub. No.: WO2017/032452
PCT Pub. Date: Mar. 2, 2017

(65) Prior Publication Data
US 2018/0253541 A1    Sep. 6, 2018

(30) Foreign Application Priority Data
Aug. 24, 2015  (DE) ............. 10 2015 011 076.4

(51) Int. Cl.
*G06F 21/00*    (2013.01)
*G06F 21/35*    (2013.01)
(Continued)

(52) U.S. Cl.
CPC ............ *G06F 21/35* (2013.01); *G06F 21/41* (2013.01); *H04L 9/32* (2013.01); *H04L 63/08* (2013.01);
(Continued)

(58) Field of Classification Search
CPC . G06F 21/35; G06F 21/41; H04L 9/32; H04L 63/08; H04L 63/0815;
(Continued)

(56) References Cited

U.S. PATENT DOCUMENTS 9,230,254 B1 *  1/2016  Sharifi Mehr ......... G06Q 20/24
9,471,914 B2 * 10/2016  Pitroda ................... G06Q 20/32
(Continued)

FOREIGN PATENT DOCUMENTS

EP    2631837 A1    8/2013

OTHER PUBLICATIONS

"Information Technology—Automatic Identification and Data Capture Techniques—Part 19: Crypto Suite RAMON Security Services for Air Interface Communications," ISO/IEC 29167-19, First Edition, May 15, 2016, 82 Pages.
(Continued)

*Primary Examiner* — Josnel Jeudy
(74) *Attorney, Agent, or Firm* — Workman Nydegger (57) ABSTRACT

A method for managing portable data carriers in a system having at least one portable data carrier, an authentication server, and several service providers systems each including reading devices and a service provider unit. The reading devices may request an authentication information item of the data carrier and relay the authentication information item to the authentication server. The authentication server may authenticate the data carrier on the basis of the authentication information item and establish an application identity associated with the data carrier in the service provider system with the help of the security identity The established application identity associated with the data carrier may be transmitted from the authentication server to the reading device of the service provider system.

17 Claims, 3 Drawing Sheets

(51) Int. Cl.
*G06F 21/41* (2013.01)
*H04L 29/06* (2006.01)
*H04W 12/06* (2021.01)
*H04L 9/32* (2006.01)
*H04W 12/77* (2021.01)
*H04L 9/00* (2022.01)
*H04L 9/08* (2006.01)

(52) U.S. Cl.
CPC ...... *H04L 63/0815* (2013.01); *H04L 63/0853* (2013.01); *H04W 12/06* (2013.01); *H04L 9/006* (2013.01); *H04L 9/0825* (2013.01); *H04L 63/0823* (2013.01); *H04W 12/77* (2021.01)

(58) Field of Classification Search
CPC ... H04L 63/0853; H04L 9/006; H04L 9/0825; H04L 63/0823; H04W 12/77; H04W 12/06
USPC .......................................................... 726/7
See application file for complete search history.

(56) References Cited

U.S. PATENT DOCUMENTS

| | | | | |
|---|---|---|---|---|
| 10,032,013 | B2* | 7/2018 | Osuki | H04L 63/10 |
| 10,368,243 | B1* | 7/2019 | Gailloux | H04L 63/083 |
| 2002/0016913 | A1 | 2/2002 | Wheeler et al. | |
| 2005/0132189 | A1 | 6/2005 | Katsube et al. | |
| 2005/0154913 | A1 | 7/2005 | Barriga et al. | |
| 2007/0143828 | A1* | 6/2007 | Jeal | H04L 63/0853 726/4 |
| 2008/0215887 | A1* | 9/2008 | Hart | G07F 7/12 713/172 |
| 2012/0036575 | A1* | 2/2012 | Davis | G07C 9/29 726/20 |
| 2012/0061465 | A1 | 3/2012 | Luo | |
| 2013/0031357 | A1* | 1/2013 | Weiss | H04L 9/3215 713/152 |
| 2015/0302394 | A1* | 10/2015 | Harper | G06Q 40/02 705/41 |
| 2015/0302402 | A1* | 10/2015 | Chan Chi Yuen | G06Q 20/322 705/71 |
| 2017/0024945 | A1* | 1/2017 | Shalev | G07C 9/27 |
| 2019/0199723 | A1* | 6/2019 | Tak | G06F 21/50 |
| 2020/0252399 | A1* | 8/2020 | Hancock | H04L 63/029 |

OTHER PUBLICATIONS

German Search Report from DE Application No. DE 10 2015 011 076.4, dated Jul. 11, 2016.
International Preliminary Report on Patentability from Application No. PCT/EP2016/001418, dated Dec. 2, 2016.
International Search Report from PCT Application No. PCT/EP2016/001418, dated Dec. 2, 2016.
"Requirements for Smart Card Readers Supporting eID and eSign Based on Extended Access Control," Technical Guideline BSITR-03119, Version 1.3, Mar. 22, 2013, pp. 1-35.

* cited by examiner

TRANSACTION SYSTEM

BACKGROUND

The present invention relates to a method for managing a data carrier in a transaction system, an authentication server of such a system as well as the transaction system.

It is known to equip portable data carriers, such as chip cards or labels, with markings which can be read out contactlessly, preferably in the form of transponders, to thus make the carrying out of a transaction between the data carrier and an accordingly devised reading device possible. A possible form of such a transaction is the arrangement of an access authorization, e.g. to a building, a traffic route, or other resources. Alternative transactions are, for example, pure payment transactions for acquiring goods or services. For this purpose, the data carrier can be coupled with a background system via which the payment transaction is then actually processed.

Also disadvantageous in the described method is that the requirements for the data carrier, like storage, processor power and data management, rise with each application of a service provider. For example, an application which makes an access to a parking garage of a first operator possible requires a specific authentication software in the portable data carrier which, where applicable, is employable solely in connection with the specific application of this service provider.

Complex data carriers for several independent applications or with several independent identities are known.

Likewise known are accordingly simpler data carriers for only one application or with only one identity.

SUMMARY

Object of the present invention is to provide a possibility to supply a resource-optimized, flexibly usable data carrier.

As a first partial aspect of the solution, there could be regarded the fact that a very simply configured portable data carrier having an identity in different applications, preferably also vis-à-vis different service providers, can be used.

A first preferred aspect of the present invention relates to a transaction method for carrying out a transaction between a portable data carrier with a hereinabove described security marking and a reading device of a service provider of the hereinabove described kind. This method is in principle independent of the data-carrier management method described hereinafter with reference to a second aspect of the solution. Consequently the transaction method is described hereinafter without reference to a data-carrier management marking on the data carrier and without reference to the hereinabove described data-carrier management steps. Subsequent to the description of the transaction method, it is shown how the data-carrier management method and the transaction method can advantageously be combined.

In a first step of the transaction method, the reading device of the service provider requests from the data carrier an authentication information item comprising the security information item of the data carrier.

The data carrier thereupon supplies the requested authentication information item to the reading device, which relays the authentication information item to the authentication server.

The authentication server authenticates the data carrier with the help of the in the authentication information item and transmits a result of the authenticating the data carrier to the reading device.

In case of a successful authentication of the data carrier, a transaction can be carried out between an application of the service provider and the data carrier.

The system comprises at least one portable data carrier, an authentication server and several service provider systems. The service provider systems have respectively reading devices and a service provider unit. The reading devices are provided to read out an application identity from portable data carriers, and the service provider unit is provided to check an authorization in the service provider system by means of a read-out application identity. The method comprises the steps of:

requesting an authentication information item from the data carrier comprising a safety identity of the data carrier by a reading device of the service provider;

supplying the authentication information item by the data carrier to the reading device;

relaying the authentication information item by the reading device to the authentication server;

authenticating the data carrier by the authentication server on the basis of the authentication information item;

establishing an application identity associated with the data carrier in the service provider system by the authentication server with the help of the security identity; and transmitting the established application identity associated with the data carrier to the reading device of the service provider system.

The solution increases in particular the usability of the data carrier without having to supply particular resources in the data carrier.

In the step of establishing, the application identity of the data carrier can be selected in the service provider system from a plurality of application identities. The flexibility of the system is therefore increased.

The established application identity is fixedly associated with the data carrier for the service provider system in the authentication server. Several fixed associations in the authentication server form the basis for an employment of the data carrier in the corresponding service provider systems.

The established application identity of the data carrier for the service provider system can be dynamically selected in the authentication server from a plurality of application identities available for the service provider system. It is therefore possible for a data carrier to dynamically select different identities in the same application. Further, advantageously it is not necessary to hold a separate identity available for each data carrier. In particular one can employ a small number of application identities to associate them dynamically with a greater number of data carriers.

To the plurality of application identities available for the service provider system which there can be dynamically selected from, can be assigned identical authorizations in the service provider system. The identity of the data carrier is concealed vis-à-vis the service provider system by the dynamic selection of the identity, without losing the possibility of a conventional authorization check with the service provider.

Preferably the reading device sends the transmitted application identity, in particular like an application identity read out directly from data carriers, to the service provider unit of the service provider system. The service provider unit and, where applicable, also wide parts of the reading device software can remain unchanged.

The portable data carrier is identifiable in the service provider system only via the application identity, thus requires no further identities stored in the (RFID) transponder.

Preferably, the portable data carrier comprises only the security identity as an identity of the data carrier for the authentication server and becomes employable by a plurality of application identities which are transmittable by the authentication server and associated with the data carrier in the plurality of service provider systems.

The data carrier is devised to execute an authentication according to ISO/IEC 29167-19. In doing so, the security identity is preferably employed as an identity.

Hereinafter, individual steps of the transaction method are specified by way of example with reference to preferred embodiments and variants of the transaction method. In doing so, the individual variants of the steps of the method can be combined arbitrarily, if nothing else is described. As a security identity, an unambiguous security information item (in the authentication server), or secret ID, is employed hereinafter. As an application identity, a public identity, public ID, is referred to.

As a rule, the security marking is configured as a cryptographically secured security marking, for example in the form of a transponder, which is devised to transfer a security information item (SID, "secret ID") solely in encrypted form to the reading device. Preferably an asymmetric key architecture is used here. In doing so, the encryption of the security information item in the security marking is effected by means of a public key, the decryption by the authentication server by means of a corresponding secret key.

The reading device can recognize such a cryptographically secured security marking as cryptographically secured, for example within the context of constructing a communication connection with the data carrier, i.e. the transponder. The construction of the communication connection can be understood here as a first substep of a step of requesting the authentication information item.

Thereupon, the reading device sends a corresponding command to the data carrier to make a cryptographically secured transferring of the authentication information item by the data carrier (for example, according to ISO/IEC 29167-19) possible. As a rule, the authentication of the data carrier is effected by means of a challenge-response method.

For this purpose, the reading device can previously request the corresponding command at the authentication server and then relay a corresponding command received from the authentication server to the data carrier, i.e. the security marking of the data carrier.

As an authentication information item, the data carrier can generate a response command according to the employed protocol, for example in the form of a cryptogram which comprises the encrypted security information item. The cryptogram can comprise further information items, which allow the authentication server to decrypt the security information item.

These further information items, which relate in particular the selection of a key required for decrypting, can also be requested separately by the reading device at the data carrier and be transferred separately by the data carrier from the cryptogram to the reading device. The authentication information item then comprises the cryptogram and the further information items.

The data carrier then transfers the authentication information item to the reading device which relays the authentication information item to the authentication server.

The security information item contained in the cryptogram in encrypted form is decrypted in the authentication server and the data carrier is authenticated by the authentication server. The authentication method can, as mentioned, be carried out for example as a challenge-response method, in which the data carrier receives a "challenge" from the authentication server, for example a random number, and "encrypts" it while employing the security information item.

Optionally, the authentication server can associate the decrypted security information item (SID) with a public marking concerning the data carrier, a so-called PID ("Public ID"). This public marking is static and unambiguously associated with the security information item (SID).

Several different public markings can be present for a data carrier. For every application of a service provider for which the data carrier is enabled, as a rule exactly one public marking of the data carrier is generated (on the part of the authentication server) which in the step of enabling the data carrier is then transmitted for a selected application of a service provider of this application. In the database of the authentication server, one or several public markings unambiguously associated with the security information item can hence be stored in addition to the data-carrier management information item and the security information item.

The authentication server thereupon transmits the result of the authentication to the reading device. This result can consist, on the one hand, simply in the fact that the authentication server notifies the reading device whether the data carrier could be successfully authenticated or not.

Optionally, in case of a successful authentication of the data carrier, the authentication server can transmit to the reading device the corresponding public marking of the data carrier which corresponds to the application of the service provider which is currently provided to carry out a transaction with the data carrier. The reading device can hand over information items about this application to the authentication server at an arbitrary place of the method, for example at the outset upon requesting a command to be relayed to the data carrier.

In this connection, is to be noted that at the time at which the data carrier establishes a communication with a reading device of a service provider, as a rule the concrete application of the service provider, with which the data carrier can hereinafter carry out a transaction, is already unambiguously certain. In the case that several applications of the service provider are "reachable" via a reading device, the user can be given the possibility to select one of these applications.

With the help of the result of the authentication, the reading device can then decide whether the transaction between the application and the data carrier should be carried out. In doing so, a public marking of the data carrier transmitted to the reading device makes an unambiguous authentication of the data carrier possible also for the reading device.

As a second partial aspect of the solution there could be regarded the fact that a management of the associated identities is supplied which is independent of the service provider systems.

The second aspect is based on the basic idea of furnishing the portable data carrier with a further marking capable of being read out contactlessly, which can be read out and processed in a simple manner by means of a portable end device of a user of the system. Information items encoded by means of the marking can then be transmitted on the part of the end device to an authentication server of the transaction system. The authentication server is devised to manage the data carrier in the system on the basis of the received information item.

According to the second aspect, the solution also relates to a method in a system which comprises at least one portable data carrier, for example a chip card or a label, an authentication server and at least one reading device of at least one service provider coupleable with the authentication server via a communication network work, for example the internet. In doing so, the data carrier is devised to contactlessly communicate with the reading device for carrying out a transaction with an application of a service provider, where applicable only after an activation in the system. For this purpose, the data carrier comprises a security marking capable of being read out contactlessly on the part of the reading device, with the help of which the data carrier is authenticatable by the authentication server.

The method according to a preferred embodiment comprises the following steps:

The data carrier is equipped with a data-carrier management marking which encodes a data-carrier management information item. In doing so, the data-carrier management information item is coupled unambiguously in the authentication server, in a manner still described in detail hereinafter, with a security information item encoded by the security marking of the data carrier. The data-carrier management marking of the data carrier is capable of being read out contactlessly by means of a portable end device of a user of the system, for example by means of a conventional mobile communication end device or a smartphone.

The data-carrier management marking is contactlessly read out by means of a portable end device of a user of the system and the data-carrier management information item encoded in the data-carrier management marking is transferred to the authentication server by means of the portable end device.

Thereafter, the authentication server manages the data carrier in the system while employing the data-carrier management information item.

The managing of the data carrier in the system can comprise a step of activating the data carrier in the system. In doing so, the data carrier in the system is not activated, i.e. cannot be employed for carrying out a transaction with an application of a service provider, not before the authentication server receives for the first time the data-carrier management information item encoded in the data-carrier management marking. In other words, a portable data carrier is registered in the system only after the data-carrier management marking has been read out for the first time and the data-carrier management information item stored therein has been transferred to the authentication server.

The managing of the data carrier in the system can furthermore comprise a step of associating the user with the data carrier. This step is optional, because applications are imaginable in which a user association with the data carrier can be omitted. Other applications, for example those which are connected to a payment transaction, necessarily require a specific association of a user with the data carrier, for example so that also account information items of this user can be coupled with the data carrier.

In the step of the associating, user registration data such as for example a user name, a password, bank data of the user and the like, can be transmitted to the authentication server. The user registration data are stored there together with the data-carrier management information item and are associated with the data-carrier management information item by the authentication server. After completion of this step, the data carrier is held as associated with that user who has been stated by the received user registration data.

The managing of the data carrier in the system can furthermore comprise a step of enabling an application of a service provider for the data carrier.

In doing so, it is to be noted that the system is constructed such that the authentication server can be connected to a plurality of service providers which offer respectively at least one application of the hereinabove indicated kind, for example an access control, the sale of different goods or services, and the like. Each service provider comprises at least one reading device via which the portable data carrier can establish communication with the service provider or with an application of the service provider. If the data carrier is now activated in the system and, where applicable, associated with a concrete user, different applications can be enabled for the data carrier. After enabling the data carrier for an application of a service provider, the system is devised to support the carrying out of a transaction between the application of the service provider and the data carrier. In other words, a user of the data carrier can then utilize an application of a service provider as a rule only when this has been enabled for the concrete data carrier.

In doing so, the step of enabling can be carried out, for example, such that the authentication server displays to the user of the data carrier, for example via a suitable web interface, a list of potentially selectable applications of different service providers. The user of the data carrier can then select therefrom one or several applications which are then enabled on the part of the authentication server for the concrete data carrier. For some of these applications it can be necessary that the user of the data carrier states further user registration data, for example account information items or the like, to make a complete and in particular automatic utilization of the application possible.

Generally, in connection with the present invention, a communication of the user of the data carrier with the authentication server can be effected via a suitable application ("app") which the user installs on his or her end device, for example his or her smartphone, in the conventionally known manner. In this way the user can then log in at the authentication server by stating his or her user registration data. Also, the first user registration can be supported by means of such an application. Alternatively or additionally, the authentication server can supply a communication interface, for example the mentioned web interface, which is utilizable for the user of the data carrier via any conventional browser (after previous login by means of the user registration data).

In all hereinabove described management steps, the authentication server recognizes the data carrier with the help of the data-carrier management information item which has been transmitted to the authentication server on the part of the portable end device of the user. This data-carrier management information item is stored in the authentication server, coupled with the security information item of the portable data carrier, e.g. in a suitable database of the authentication server. Together with the data-carrier management information item and security information item, corresponding user registration data can then also be stored and managed.

Thus a user of the system can activate in very simple manner a data carrier at the system, register himself or herself as a user of the data carrier and enable the data carrier for different applications of different service providers. Thus a flexible and simple utilization of the data carrier in different application contexts is possible.

The step of enabling an application of a service provider, as a rule, is carried out by a user associated with the data carrier as explained above.

Alternatively, it is also possible that individual applications of specific service providers are enabled for a user of the data carrier by the respective service provider itself. For this purpose, the service provider can on its part contactlessly read out the data-carrier management marking of the data carrier by means of a suitable reading device and transmit the data-carrier management information item encoded in the data-carrier management marking to the authentication server. This, as a rule, relates to such applications that are accessible only to a specific user group, such as for example the access to a parking garage of a residential complex which should be accessible solely to inhabitants of the residential complex. In doing so, the service provider is e.g. the operator of the residential complex who, after a check whether a potential user is also an inhabitant of the residential complex, can enable this for the access to the parking garage in the stated manner.

An application of a service provider can be enabled in particular such that a transaction can subsequently be carried out between the data carrier and the application automatically, that is, without further user interaction or the necessity for a further data input or a transaction confirmation. This allows an especially simple carrying out of such transactions.

Alternatively or additionally it is possible to enable individual applications only in principle, while for carrying out the relevant transaction, however, a further user interaction, at least a transaction confirmation or the like, is provided.

The data-carrier management method according to the second aspect of the invention and the transaction method according to the first aspect of the invention can be combined advantageously such that the authentication server can check, in addition to authenticating the data carrier, whether the corresponding data carrier is already activated in the system. Furthermore, the authentication server can check whether a corresponding user is already associated with the data carrier and whether that application which the service provider currently connected with the data carrier via the reading device offers, is already enabled for the concrete data carrier.

In the step of transmitting a result of the authentication, the authentication server can hence notify the reading device not only whether the data carrier has been authenticated successfully, but also whether the data carrier is already activated in the system and whether the application at issue has already been enabled for the data carrier.

On the other hand, the authentication server can prompt the user of the data carrier to enable the application if it recognizes, for example after successfully authenticating the data carrier, that the application at issue has not yet been enabled for the data carrier.

A third aspect of the present invention relates to an authentication server for a transaction system. This system comprises at least one data carrier described hereinabove with reference to the first aspect of the invention, the authentication server itself and at least one reading device of at least one service provider, said reading device being coupleable with the authentication server via a communication network.

The authentication server is devised in particular to receive from the reading device a security information item encoded in the security marking of the data carrier and to authenticate the data carrier with the help of the security information item. Furthermore, the authentication server is devised to receive from a portable end device coupleable via a communication network with authentication server a data-carrier management information item encoded in the data-carrier management marking and to manage the data carrier in the system in hereinabove described manner while employing the data-carrier management information item.

Preferably, the authentication server is devised to store and manage for the at least one data carrier, for example in a suitable database or the like, the security information item, where applicable, a cryptographic key for the decrypting of a security information item received in encrypted form, together with the data-carrier management information item as well as, where applicable, further management data relating to the data carrier, such as for example user registration data of a user associated with the data carrier, or information items with regard to applications enabled for the data carrier of service providers. In particular, the authentication server is devised to support a data-carrier management method described hereinabove with reference to the first aspect of the invention and preferably also a transaction method described hereinabove with reference to the second aspect of the invention.

A fourth aspect of the present invention relates to a corresponding transaction system, comprising at least one portable data carrier according to the first aspect of the invention, an authentication server according to the third aspect of the invention as well as at least one reading device coupleable with the authentication server via a communication network of at least one service provider of the hereinabove described kind.

The at least one data carrier of the system is configured preferably as a chip card or as a label (label, tag).

The security marking of the portable data carrier can be formed preferably by means of an RFID transponder, for example as an NFC transponder or as an UHF transponder.

According to a preferred variant, the transponder is devised to encrypt a security information item stored in the transponder and to transmit it to a reading device of a service provider only in encrypted form.

The data-carrier management marking of the data carrier could likewise be configured in the form of a transponder, preferably as an NFC transponder. Preferably the data-carrier management marking is configured as a marking capable of being read out optically, preferably as a bar code, particularly preferably as a CR code.

BRIEF DESCRIPTION OF THE DRAWINGS

The present invention will hereinafter be described by way of example with reference to the attached drawings. Therein are shown.

DETAILED DESCRIPTION OF VARIOUS EMBODIMENTS

Figure 1:
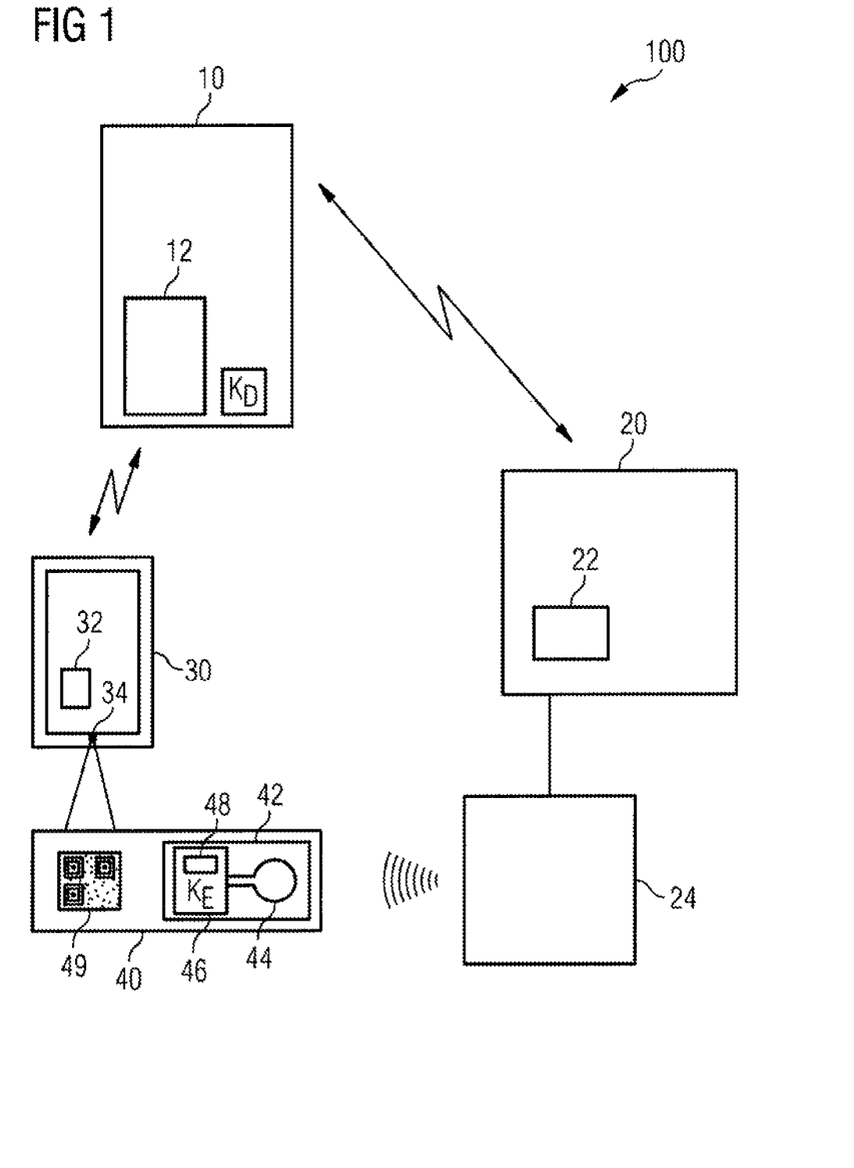
FIG. 1 components of a preferred embodiment of a system according to the invention.

A transaction system 100 represented schematically and by way of example in FIG. 1 comprises an authentication server 10, at least one portable data carrier 40, at least one reading device 24 of a service provider 20 as well as at least one portable end device 30 of the user of a system 100. As will become distinct hereinafter, such a system 100 will comprise as a rule a plurality of data carriers 40 and a multiplicity of reading devices 24 of different service providers 20.

The authentication server 10 is devised to be coupled via a suitable communication network work, for example the internet, with the reading device 24 or the service provider 20 which the reading device 24 is connected to, and to the end device 30. The authentication server 10 comprises a suitable storage device 12, for example a database, to store and manage different data described hereinafter in detail which relate to the data carrier 40 and its management in the system 100. The function and the operation method of the authentication server 10 will hereinafter become clear with reference to the methods according to the FIGS. 2 and 3.

The data carrier 40 comprises a security marking 42. This is configured as a transponder in the shown example. According to application, an NFC transponder, an UHF transponder or the like can be used. The transponder 42 comprises a transponder chip 46 and an antenna 44. A security information item (SID) 48 is stored in the transponder chip as well as a public key $K_E$ for encrypting the security information item 48. The transponder chip 46 is devised to encrypt the security information item 48 by means of the key $K_E$ and to transfer it to a reading device 24 only in encrypt form.

The data carrier 40 further comprises a data-carrier management marking 49. The data-carrier management marking 49 is devised to be read out contactlessly by means of the portable end device 30. In principle, the data-carrier management marking 49 can also be configured as a transponder, for example as an NFC transponder. However, the data-carrier management marking 49 is preferably configured, as represented in FIG. 1, as a marking capable of being read out optically, particularly preferably as a QR code. A reading out and evaluating of such a marking can be effected by means of a conventional smartphone camera and a corresponding analysis application in a simple manner.

The data carrier 40 is registered in the authentication server 10 of the system 100. For this purpose, the authentication server 10 stores the security information item 48 of the data carrier 40 together with data-carrier management information item encoded in the data-carrier management marking 49. In this manner, the authentication server 10 can identify the data carrier 40 respectively unambiguously and perform an association between both information items when it receives one of these two information items, i.e. the security information item 48 or the data-carrier management information item.

As mentioned hereinabove, the portable end device 30 can be configured as a smartphone, as is shown in FIG. 1. The end device 30 is devised to read out the data-carrier management marking 49 of the data carrier 40, in the shown example optically, by means of a camera 34 and a corresponding analysis application 32. In the case that the data-carrier management marking 49 is configured as an NFC transponder, a NFC-capable smartphone or the like can be employed as an end device 30. The end device 30 does not have to be able to read out the security marking 42 of the data carrier 40.

The data carrier 40, i.e. more precisely the security marking 42 of the data carrier 40, can be connected to an application 22 of the service provider 20 via the reading device 24 for carrying out a transaction, as this is described hereinafter with reference to FIG. 3.

A data-carrier management method can be employed as it is described hereinafter with reference to FIG. 2 to activate the data carrier 40 in the system, associate it with a user and enable it for the application 22.

In a first Step S1, the data carrier 40 is equipped with a data-carrier management marking 49, for example the hereinabove described QR code. In doing so, the data-carrier management marking 49 is incorporated on the data carrier 40 or in the data carrier 40 such that it is capable of being contactlessly read out by the end device 30 of the user.

The data-carrier management marking 49 encodes a data-carrier management information item, for example a character string unambiguously associated with the data carrier. As mentioned hereinabove, the data-carrier management information item of the data carrier 40 in the authentication server 10 is unambiguously coupled with the security information item 48 of the data carrier 40.

In Step S2, the data-carrier management marking 49 is read out contactlessly by means of a portable end device 30 of a user of the system 100. In the shown example, the user will read out the QR code 49 by means of the smartphone 30 and the camera 34, and relay the data-carrier management information item stored therein in Step S3 to the authentication server 10. In the data-carrier management marking 49, for example an internet address of the authentication server 10 can be stored in addition to the data-carrier management information item, to be able to automate the Step S3 of transmitting.

Now in Step S4, the authentication server 10 manages the data carrier 40 in the system 100 while employing the data-carrier management information item received in Step S3.

Figure 2:
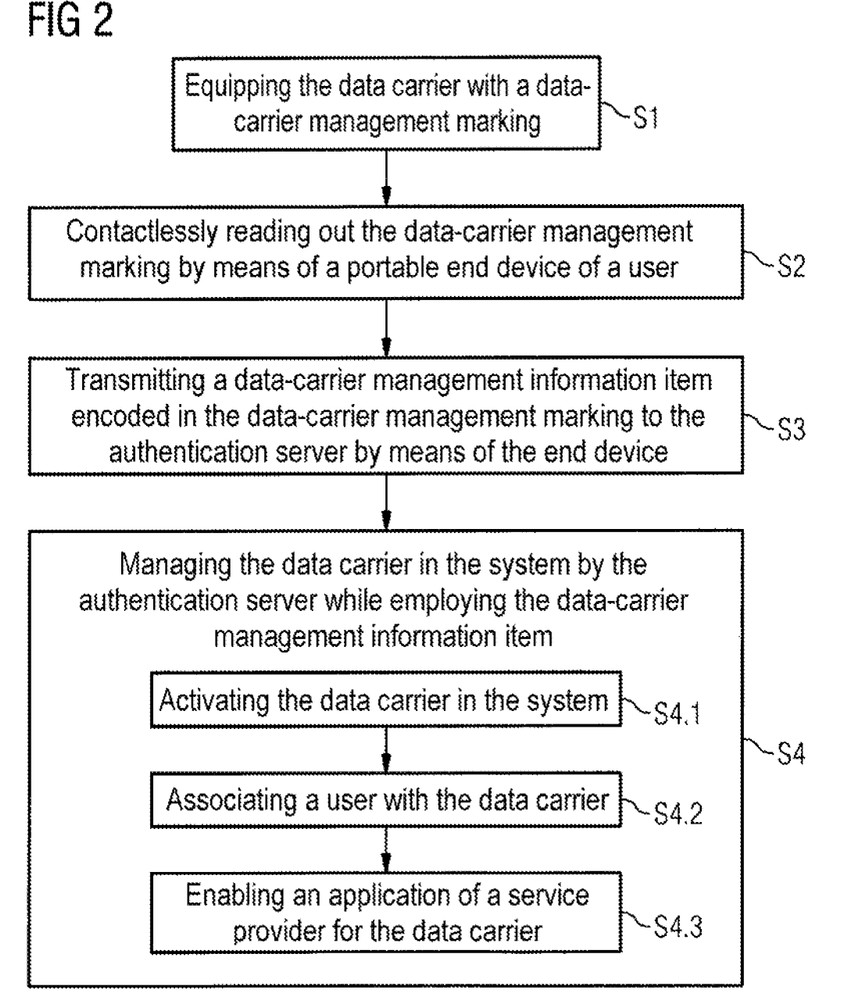
FIG. 2 steps of a preferred embodiment of a method for managing a data carrier in the system according to FIG. 1 and FIG. 3 steps of a preferred embodiment of a transaction method in the system according to FIG. 1.

The managing of the data carrier 40 in the system 100 can relate to different aspects which are indicated in FIG. 2 in the substeps S4.1, S4.2 and S4.3.

In Step S4.1 the data carrier 40 in the system 100 is activated. In principle, a data carrier 40 is devised to be employed in the system 100 in the manner described with reference to the FIG. 3. However, as a rule, a one-time activation of the data carrier 40 is required for this purpose. Such an activation can be effected by the authentication server 10 once receiving from the end device 30 the data-carrier management information item encoded in the data-carrier management marking 49. From this time on, the authentication server 10, as a data-carrier management step, can record the data carrier 40 as activated in the system 10. It is possible that the authentication server 10 also reverses such an activation of the data carrier 40, for example when an abuse of the data carrier 40 is present or at least assumed.

A further data-carrier management step indicated with reference to Step S4.2 comprises the associating of a user with the data carrier 40. Applications are imaginable with which such a user association with the data carrier, which does not exist a priori, is not required. As a rule, however, an association of a user with the data carrier 40 will be effected once. In doing so, the user registers himself or herself with the authentication server 10 as the user of the data carrier 40. When such a registration is concluded, no other user can register himself or herself as a user of the data carrier 40, that is, the data carrier 40 is unambiguously associated with that user who was the first to register himself or herself. In principle, it can be provided that a user registered once is changed and a new user is entered. It can be also provided that per data carrier a limited number of users, i.e. more than one user, can be registered, then preferably with the same password to avoid abuse.

For associating a user with the data carrier 40, the data-carrier management marking 49 is also read out in hereinabove described manner by means of the end device 30 and the data-carrier management information item encoded therein is transferred to the authentication server 10. Thereupon, when the authentication server 10 has identified the data carrier 40 with the help of the data-carrier management information item, user registration data of the user can be transmitted to the authentication server 10 by means of the end device 30. Such user registration data can comprise in particular a user name and a password of the user. Thus the user can hereinafter log in at the authentication server 10 for further management of the data carrier 40 and for inputting further data relating to the utilization of the data carrier 40 in the system, such as for inputting or changing account information items for enabling an automatic carrying out of a payment transaction by means of the data carrier 40 or the like.

A further management step relates to enabling an application of a service provider 20 for the data carrier 40 as this is indicated in Step S4.3. Before a user can employ an application 22 of a service provider 20 by means of the data carrier 40, for example the application 22 shown in FIG. 1, i.e. can carry out a transaction with application 22 by means of the data carrier 40, the relevant application 22 must be enabled for the data carrier 40. To make such an enabling possible, the user of the data carrier 40 can effectively carry out a login of the data carrier 40 at the authentication server 10 by again reading out of the data-carrier management marking 49 by means of the end device 30 and by transmitting data-carrier management information items encoded in the data-carrier management marking 49 to the authentication server 10. The authentication server 10 then offers the possibility of enabling individual applications 22 which are displayed to the user of the data carrier 10, for example in the form of a list. The user of the data carrier 40 can select individual applications from this list which are then enabled on the part of the authentication server 10 for employment by the data carrier 40. In principle, there can be also provided applications which can be employed by a data carrier activated in the system 40 without prior enabling.

It will be appreciated that after a one-time reading out of the data-carrier management marking 49 and transmitting the data-carrier management information item encoded therein, effectively within a "session", a multiplicity of the steps S4.1, S4.2 or S4.3 can be carried out without always having to repeat the reading out and transmitting before the carrying out of each of the steps. However, once the data communication between the end device 30 and the authentication server 10 is terminated, the renewed or first-time carrying out of, for example the Step S4.3, requires a previously renewed carrying out of the Steps S2 and S3.

Figure 3:
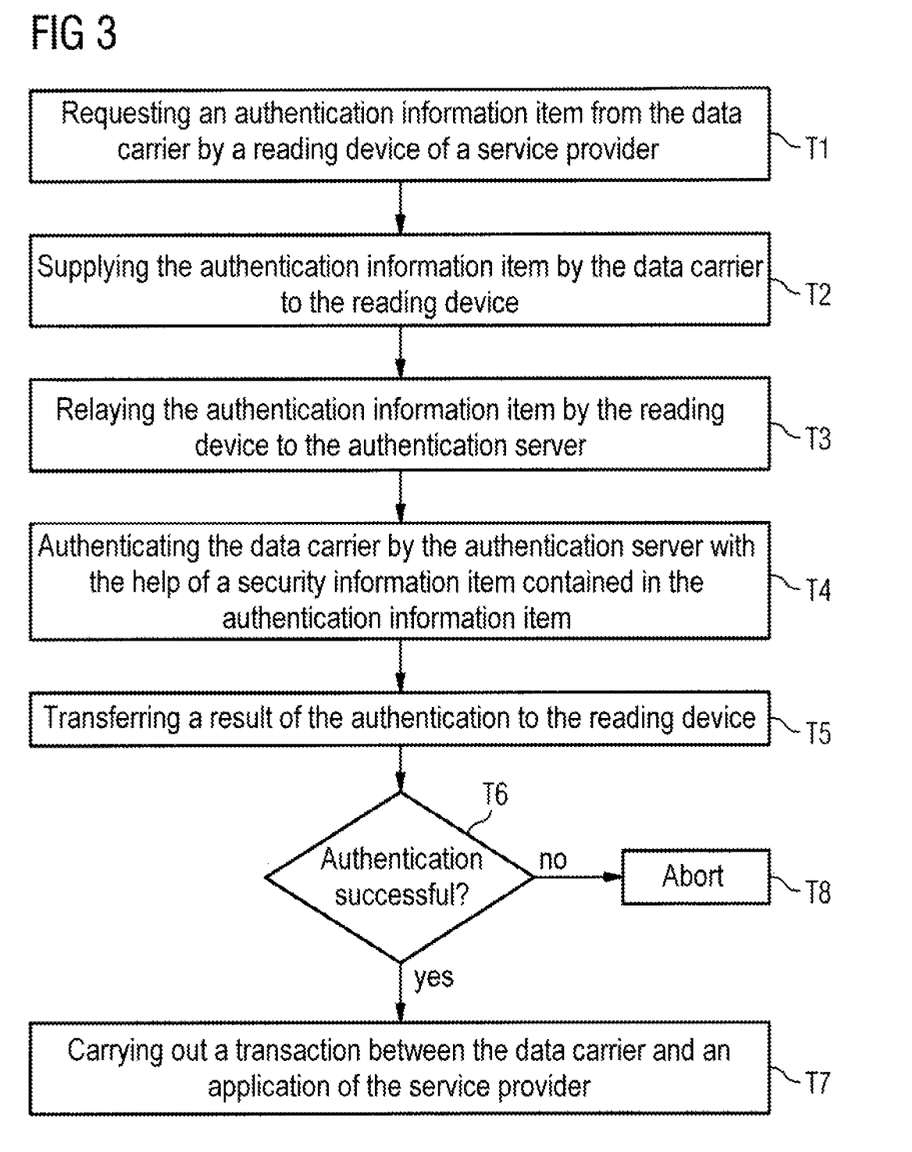

With reference to FIG. 3, hereinafter a transaction method is described by way of example, i.e. a method for carrying out a transaction between the data carrier 40 and an application 22 of the service provider 20. Such a method is in principle independent of a data-carrier management method according to FIG. 2.

In Step T1, a reading device 24 of a service provider 20, when it recognizes a portable data carrier 40 in the response range of the reading device 24, requests the data carrier 40 to supply an authentication information item. In doing so, the reading device 24 can be devised to recognize whether the data carrier 40 is a secure data carrier in the manner that the security marking 42 of the data carrier 40 supplies a security information items 48 of the data carrier 40 solely in encrypted manner, with the help of which the authentication server 10 can authenticate the data carrier 40. In this case the reading device 24 can, for example, request from the authentication server 10 a corresponding command which makes an authentication method possible while employing an security information item 48 transferred in encrypted form. In connection with the present invention, for example a protocol can be employed for this purpose according to the ISO/IEC 29167-19 with which a special challenge-response method is applied for the data-carrier authentication. In this case the security information item 48 is defined as an eight byte-long marking.

In Step T2, the data carrier 40 supplies a corresponding authentication information item to the reading device 24. This authentication information item comprises in particular the security information item 48, as hereinabove mentioned, preferably in encrypted form. For this purpose the security marking 42 comprises an encryption key $K_E$ for encrypting the security information item 48. In doing so, the key $K_E$ can be, for example, a public key of an asymmetric key pair, wherein the authentication server 10 comprises a secret key pair $K_D$ (cf FIG. 1) appurtenant to the key pair to be able to again decrypt the encrypted security information item 48.

The data carrier 40 can generate the authentication information item, for example as a cryptogram in accordance with the hereinabove described standard. The authentication information item comprises in particular also a further information item which allows the authentication server 10 to determine the secret key $K_D$ required for decrypting the encrypted security information item. This further information can be a part of the cryptogram. Alternatively, the reading device 24 can request such further information items separately from the data carrier 40 and add it to the authentication information item. An example of such a further information item is a specific group identity which defines a group which is associated with the data carrier 40. For each of these groups there then exists a uniform public key $K_E$ and a corresponding secret key $K_D$.

In Step T3, the reading device 24 relays the authentication information item received from the data carrier 40 to the authentication server 10.

Said authentication server authenticates in Step T4 the data carrier 40 with the help of the security information item contained in the authentication information item 48. For this purpose, the authentication server 10 decrypts the encrypted security information item 48 contained in the authentication information item by means of the secret key $K_D$. While employing a hereinabove indicated challenge-response method, an unambiguous authentication of the data carrier 40 can in this manner be effected in a per se known manner.

Optionally, the authentication server 10 can now, after successful authentication of the data carrier 40, unambiguously associate the security information item 48 of the data carrier 40 with a public marking (PID) of the data carrier 40. In doing so, it can be provided that the authentication server 10 generates for each application 22 of a service provider 20, which has been enabled for the data carrier 40, a separate public marking of the data carrier 40, associates this with the security information item 48 of the data carrier 40, and transmits this to the respective application of the service provider. The application can then itself authenticate the data carrier 40 unambiguously via the corresponding public marking.

The format of such a public marking is in principle freely selectable per application 22 and can be adapted to the requirements of the application 22. With the help of such a public marking, an application 22, if this is required, can "recognize again" a user of the data carrier 40 in the course of a transaction, for example in a toll application with a multiplicity of toll places. In doing so, the true identity of the user of the data carrier 40, which as a rule is unknown to the service provider 20, can remain concealed. The transferring of the public marking instead of the security marking 48 from the authentication server 10 to the reading device 24, offers furthermore the advantage that the reading device 24 then does not have both present, plaintext (security marking) and cryptogram (encrypted security marking), and could therefrom possibly make inferences about the encryption.

In Step S5, the authentication server 10 transmits a result of authenticating the reading device 24, that is, in particular the fact whether the data carrier 40 has been authenticated successfully, and if yes, additionally, where applicable, a public marking of the data carrier 40, which is associated with that application 22 of a service provider 20 which the data carrier 40 now intends to carry out a transaction with. As indicated hereinabove, the specific application 22 is known to the authentication server 10.

In Step T6, the reading device 24 checks the obtained results, that is it checks whether the data carrier 40 has been unambiguously authenticated on the part of the authentication server 10 and, where applicable, whether the received public marking of the data carrier 40 matches the public marking known for the application. If disagreements result relating to the public marking or if the authentication has generally failed, the method is aborted as is stated with reference to Step T8.

In case of an altogether successful authentication, a transaction is carried out in Step T7 between the data carrier 40 and the application 22 of the service provider 20.

Generally, it can be ascertained that the authentication server 10 therefore makes a series of advantageous functionalities available. On the one hand, said authentication server can check the authenticity of the data carrier 40 for different applications 22 of different service providers 20, while the data carrier 40 can remain anonymous vis-à-vis the service providers. The authentication server 10 can also ascertain whether the data carrier 40 is already enabled for a specific application 22. Furthermore, the authentication server 10, because to the data carrier 40 corresponding user registration data can be managed, can operate as a clearing entity and support, for example, an accounting of different applications for different service providers.

The provision of the data-carrier management marking 49 on the data carrier 40 makes a very simple management of the data carrier 40 in the system 100 possible for a user of the data carrier 40. For this purpose, no new technical means are required, a conventional smartphone, which the user employs anyway in everyday life, is completely sufficient to carry out the essential data-carrier management steps, namely the activating of the data carrier 40 in system 100, the associating of a user with the data carrier 40 as well as the enabling of individual applications 22. In this manner it becomes possible for the first time to supply one and the same portable data carrier 40, which can contactlessly interact with different applications 22 of different service providers 20.

It will be appreciated that a user can employ different portable data carriers 40, for example on one occasion in the form of a chip card, on another occasion in the form of a label. In doing so, the authentication server 10 can, of course, also manage different data carriers 40 for a user.

The invention claimed is:
1. A method for managing data carriers comprising the steps:

requesting from at least one of the data carriers an authentication information item comprising a security identity of said data carrier by a reading device of a service provider system within a plurality of service provider systems, each of the plurality of service provider systems including at least one reading device and a processor;

supplying the authentication information item by said data carrier to said reading device;

relaying the authentication information item by the reading device to an authentication server arranged to communicate with each of the plurality of service provider systems;

authenticating said data carrier by the authentication server on the basis of the authentication information item;

establishing an application identity associated with said data carrier in the service provider system by the authentication server with the help of the security identity; and transmitting the established application identity associated with said data carrier to the reading device of the service provider system;

wherein the at least one reading device of each of the plurality of service provider systems is provided for reading out an application identity from the data carriers, and wherein the processor is provided to check an authorization in the service provider system by means of the read-out application identity.

2. The method according to claim 1, wherein in the step of establishing, the application identity of the data carrier is selected in the service provider system from a plurality of application identities.

3. The method according to claim 1, wherein the established application identity is fixedly associated with the data carrier for the service provider system in the authentication server.

4. The method according to claim 1, wherein the established application identity is dynamically selected with the data carrier for the service provider system in the authentication server from a plurality of application identities available for the service provider system.

5. The method according to claim 4, wherein to the plurality of application identities available for the service provider system and of which it is dynamically selected from, identical authorizations are assigned in the service provider system.

6. The method according to claim 1, wherein the reading device sends the transmitted application identity to the processor of the service provider system.

7. The method according to claim 1, wherein the data carrier is identifiable in the service provider system only by the application identity.

8. The method according to claim 1, wherein the data carrier comprises only the security identity as an identity of the data carrier for the authentication server and is employable by a plurality of application identities, which are transmittable by the authentication server and associated with the data carrier, in the plurality of service provider systems.

9. The method according to claim 1, wherein the data carrier is equipped with a data-carrier management marking which encodes a data-carrier management information item and which is capable of being read out contactlessly by means of a portable end device of a user of the system, wherein the data carrier is managed on the authentication server in advance with the following steps:
contactlessly reading out the data-carrier management marking by means of the portable end device and transmitting to the authentication server the data-carrier management information items encoded in the data-carrier management marking;
managing the data carrier in the system while employing the data-carrier management information item.

10. The method according to claim 1, wherein a management of the data carrier on the authentication server comprises:
associating at least one service provider system from the plurality of the service provider systems with the data carrier.

11. An authentication server arranged for managing data carriers, the authentication server being a hardware server comprising:
a communication network interface arranged to communicate with each of a plurality of service provider systems, each of the plurality of service provider systems including at least one reading device and a processor; and
a memory storing a database;
wherein the authentication server is configured to:
receive an authentication information item of at least one of the data carriers from the at least one reading device of a service provider within the plurality of service provider systems, the authentication information item comprising a security identity of said data carrier supplied by said data carrier to said reading device in response to a request by said reading device;
authenticate said data carrier on the basis of the authentication information item;
establish an application identity associated with said data carrier in the service provider system with the help of the security identity; and
transmit the established application identity associated with said data carrier to the reading device of the service provider system;
wherein the at least one reading device of each of the plurality of service provider systems is provided for reading out an application identity from the data carriers; and
wherein the processor is provided to check an authorization in the service provider system by means of the read-out application identity.

12. The authentication server according to claim 11, wherein the authentication server is devised to store and manage the security identity for the at least one of the data carriers together with a data-carrier management information item in the database.

13. The authentication server according to claim 11, wherein the authentication server forms part of a transaction system comprising
at least one portable data carrier,
the authentication server according to claim 11 as well as
at least one reading device of at least one service provider coupleable with the authentication server via a communication network,
wherein the data carrier is devised to communicate contactlessly with the reading device and comprises a security marking capable of being read out contactlessly on the part of the reading device as well as a data-carrier management marking capable of being read out contactlessly by means of a portable end device.

14. The authentication server according to claim 13, wherein the security marking of the data carrier is configured as an RFID transponder.

15. The authentication server according to claim 13, wherein the data-carrier management marking is configured as a marking capable of being read out optically.

16. The method according to claim 1, wherein the established application identity associated with the data carrier in the service provider system is different from application identities associated with the data carrier in other service provider systems of the plurality of service provider systems.

17. A method for managing data carriers comprising the steps:
requesting from at least one of the data carriers an authentication information item comprising a security identity of said data carrier by a reading device of a service provider system within a plurality of service provider systems, each of the plurality of service provider systems including at least one reading device and a processor;
supplying the authentication information item by said data carrier to said reading device;
relaying the authentication information item by the reading device to an authentication server arranged to communicate with each of the plurality of service provider systems;
authenticating said data carrier by the authentication server on the basis of the authentication information item;
establishing an application identity associated with said data carrier in the service provider system by the authentication server with the help of the security identity, said establishing the application identity comprising selecting the application identity in the service provider system from a plurality of application identities and fixedly associating the application identity with the data carrier;
transmitting the established application identity associated with said data carrier to the reading device of the service provider system;
authenticating said data carrier by the reading device on the basis of the established application identity;
wherein the at least one reading device of each of the plurality of service provider systems is provided for reading out an application identity from the data carriers, and
wherein the processor is provided to check an authorization in the service provider system by means of the read-out application identity.

* * * * *